United States Patent
Jorasch et al.

(10) Patent No.: US 8,769,420 B2
(45) Date of Patent: *Jul. 1, 2014

(54) SYSTEMS AND METHODS FOR WEBPAGE CREATION AND UPDATING

(71) Applicant: Shutterfly, Inc., Redwood City, CA (US)

(72) Inventors: Craig Jorasch, Palo Alto, CA (US); Thomas E. McGannon, Menlo Park, CA (US); Syed Saleem Javid Brahmanapalli, Fremont, CA (US); Benjamin C. Guthrie, Sunnyvale, CA (US); Irene Chan, San Francisco, CA (US)

(73) Assignee: Shutterfly, Inc., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/668,638

(22) Filed: Nov. 5, 2012

(65) Prior Publication Data

US 2014/0006526 A1    Jan. 2, 2014

Related U.S. Application Data

(63) Continuation-in-part of application No. 13/111,540, filed on May 19, 2011, now Pat. No. 8,312,381, and a continuation of application No. 12/354,576, filed on Jan. 15, 2009, now abandoned.

(60) Provisional application No. 61/022,056, filed on Jan. 18, 2008, provisional application No. 61/022,062, filed on Jan. 18, 2008, provisional application No. 61/022,069, filed on Jan. 18, 2008.

(51) Int. Cl.
G06F 3/00 (2006.01)
G06F 15/16 (2006.01)

(52) U.S. Cl.
USPC .......... 715/753; 715/751; 715/760; 715/765; 715/733; 709/203; 709/204; 709/206

(58) Field of Classification Search
USPC ......... 715/700, 733, 751, 752, 753, 760, 764, 715/765, 205, 234; 709/200, 203, 204, 206
See application file for complete search history.

(56) References Cited

U.S. PATENT DOCUMENTS

| | | | |
|---|---|---|---|
| 6,526,443 B1 | 2/2003 | Goldsmith | |
| 7,325,193 B2 | 1/2008 | Edd | |
| 7,916,322 B2 | 3/2011 | Pineau | |
| 2001/0001865 A1* | 5/2001 | Barraclough et al. | 709/206 |
| 2002/0174185 A1 | 11/2002 | Rawat | |
| 2007/0288551 A1* | 12/2007 | Sidon | 709/203 |
| 2009/0031232 A1* | 1/2009 | Brezina et al. | 715/764 |

* cited by examiner

Primary Examiner — Xiomar L Bautista
(74) Attorney, Agent, or Firm — Xin Wen (57) ABSTRACT

A computer network system for posting content at a web site includes computer servers configured to host a web site for a group of users, and a data storage configured to store an email address in association with a destination at the website. The computer servers can receive an electronic message at the email address by the computer servers from a user. A computer processor can automatically extract content from the electronic message. The computer servers can automatically post the content extracted from the electronic message at the destination at the website.

20 Claims, 5 Drawing Sheets

SYSTEMS AND METHODS FOR WEBPAGE CREATION AND UPDATING

PRIORITY PATENT APPLICATIONS

The present patent application is a continuation-in-part application of and claims priority to commonly assigned co-pending U.S. patent application Ser. No. 13/111,540, entitled "Systems and methods for webpage creation and updating", filed May 19, 2011. U.S. patent application Ser. No. 13/111,540 is a continuation application of U.S. patent application Ser. No. 12/354,576, entitled "Systems and methods for webpage creation and updating", filed Jan. 15, 2009, which in turn claims priority to provisional U.S. patent application 61/022,056, entitled "Systems and methods for webpage creation and updating", provisional U.S. patent application 61/022,062, entitled "Systems and methods for webpage design and content entry", and provisional U.S. patent application 61/022,069, entitled "Systems and methods for webpage notification and access control" filed on Jan. 18, 2008 by the same inventors. The disclosure of these related patent applications are incorporated herein by reference.

BACKGROUND OF THE INVENTION

The present invention relates generally to providing content to web pages.

As the Internet has grown more popular, a website has become a "front door" of an institution to the users. The quality, accuracy, completeness of content presented on a website can largely determine the effectiveness of the web site. As a result, substantial resources are often expended in ensuring that the content of a website is accurate, current, complete, and easily accessed.

Creating a website is often a daunting task, which typically requires the collaboration of a number of web content creators, web developers that format the content into appropriate Hypertext Transfer Markup Language (HTML) documents, and reviewers that ensure content accuracy and currency. For example, a web blog site can publish comments from a large number of users.

Moreover, web sites are typically extremely dynamic in nature, and are often updated with new content on a frequent basis, e.g., to incorporate new product releases, new support issues, new pricing structures, etc. As a result, the content presented in a website will typically be in a constant state of flux.

Given the significant manpower resources required to create and update a web site, management of a web site, in general, is often cumbersome and extremely time consuming. Interfacing various individuals to ensure that all content at a website is accurate and up-to-date is often haphazard and inefficient.

There is therefore a need for timely and efficiently add content to web pages from a wide range of sources.

SUMMARY OF THE INVENTION

In one aspect, the present application relates to a system for co-authoring web pages. The system includes a data storage that can store internal content for a web page to be displayed on computer devices; and an application server that can communicate with a first computer device operated by a first user and a second computer device operated by a second user through a computer network, wherein the application server can retrieve the internal content for the web page from the data storage and send the internal content to the first computer device and the second computer device on which the web page is respectively displayed, wherein the application server can receive input to the web page from the first user using the first computer device and from the second user using the second computer device, wherein the application server can send updated internal content for the web page based the input to the first computer device and the second computer device to allow the web page comprising the input from the first user and the second user to be displayed in real time on the first computer device and the second computer device.

In another aspect, the present application relates to a system for co-authoring web pages. The system includes a data storage that can store internal content for a web page to be displayed on computer devices; a data server that can receive external content for the web page from an external information source; and an application server that can communicate with a first computer device operated by a first user and a second computer device operated by a second user through a computer network, wherein the application server can retrieve the internal content for the web page from the data storage and send the internal content to the first computer device and the second computer device on which the web page is respectively displayed, wherein the application server can receive input to the web page from the first user using the first computer device and from the second user using the second computer device, wherein the application server can send updated internal content for the web page based the input to the first computer device and the second computer device to allow the web page comprising the input from the first user and the second user to be displayed in real time on the first computer device and the second computer device, wherein the application server can receive the external content from the data server and send the external content to the first computer device and the second computer device to allow the external content to be displayed on the web page over the first computer device and the second computer device.

In another aspect, the present application relates to a method for co-authoring web pages. The method includes storing internal content for a web page by a data storage; retrieving the internal content for the web page from the data storage by an application server, the application server being able to communicate with a first computer device operated by a first user and a second computer device operated by a second user through a computer network; sending the internal content from the application server to the first computer device and the second computer device to allow the web page comprising the internal content to be displayed on the first computer device and the second computer device; receiving input to the web page from the first user using the first computer device and from the second user using the second computer device by the application server; and sending updated internal content for the web page based the input from the application server to the first computer device and the second computer device to allow the web page comprising the input from the first user and the second user to be displayed in real time on the first computer device and the second computer device.

Implementations of the system may include one or more of the following. The input from the first user and the second user can include text, an image, or a combination of text and an image. The web page can be displayed on the first computer device using a web browser application. The system can further include a data server in communication with the application server. The data server can receive external content for the web page from an external information source. The application server can send the external content to the first computer device and the second computer device to allow the external content to be displayed on the web page over the first computer device and the second computer device. The application server can resolve conflicts between input from the first user and the second user. The application server can resolve conflicts by rejecting at least one input from the first user and the second user. The application server can resolve the conflicts by accepting the earlier input from the first user and the second user while rejecting the latter input from the first user and the second user.

In another aspect, the present application relates to a method for posting content at a web site. The method includes hosting a web site by one or more computer servers for a group of users comprising a first user and a second user; setting up an email address in association with a destination at the website; receiving an electronic message at the email address by the one or more computer servers from the first user; automatically extracting content from the electronic message by a computer processor; and automatically posting the content extracted from the electronic message at the destination at the website by the one or more computer servers.

In another aspect, the present application relates to a computer network system for posting content at a web site. The computer network system includes one or more computer servers that can host a web site; a data storage that can store an email address in association with a destination at the website, wherein the one or more computer servers can receive an electronic message at the email address by the one or more computer servers from a first user; and a computer processor that can automatically extract content from the electronic message, wherein the one or more computer servers can automatically post the content extracted from the electronic message at the destination at the website.

Implementations of the system may include one or more of the following. The destination at the website is located at a web address comprising a string of characters, and wherein the email address is set up to include the string of characters that are also in the web address. The web address and the email address can share one or more common words. The web address can have a format:

http: followed by //characterstring1.characterstring2.characterstring3, and wherein the email address is set up in a format: "characterstring1" followed by "@characterstring2.characterstring3", wherein each of "characterstring1", "characterstring2", and "characterstring3" represents a string of characters. The web address can have a format:

http: followed by //characterstring1.characterstring2.characterstring3/characterstring4, and the email address is set up in a format: "characterstring1.characterstring4" followed by "@ characterstring2.characterstring3", wherein each of "characterstring1", "characterstring2", "characterstring3", and "characterstring4" represents a string of characters.

The destination at the website can include a webpage. The destination at the website can include a section of a webpage. The destination at the website can include an image previously posted on a webpage at the website. The content can include an image embedded in or attached to the electronic message. The content can include text. The text can be automatically extracted from the electronic message by the computer processor. The text can be automatically parsed and categorized into one or more groups, and wherein text is posted at the destination at the website according to the one or more groups. The method can further include automatically sending an email notification, the one or more computer servers, to the second user about the content posted by the first user at the destination at the website. The method can further include giving permission to the second user to receive the email notification by a manager or an owner of the website before the step of automatically sending an email notification. The method can further include receiving definition from the second user about the frequency and type of content in the email notification, wherein the email notification includes the type of content and is sent at the frequency as defined by the second user before the step of automatically sending an email notification.

Embodiments may include one or more of the following advantages. The disclosed systems and methods allow multiple users to co-author a webpage in real time. The users can be remotely located, and be strangers to each other. Content from external sources can be fed and effectively integrated with the content on the web page created by the multiple users. The disclosed systems and methods can significantly increase the flexibility and reduce the amount of time for creating content for web pages. The disclosed systems and methods can also broaden the content sources for web pages.

Although the invention has been particularly shown and described with reference to multiple embodiments, it will be understood by persons skilled in the relevant art that various changes in form and details can be made therein without departing from the spirit and scope of the invention.

DETAILED DESCRIPTION

Figure 1:
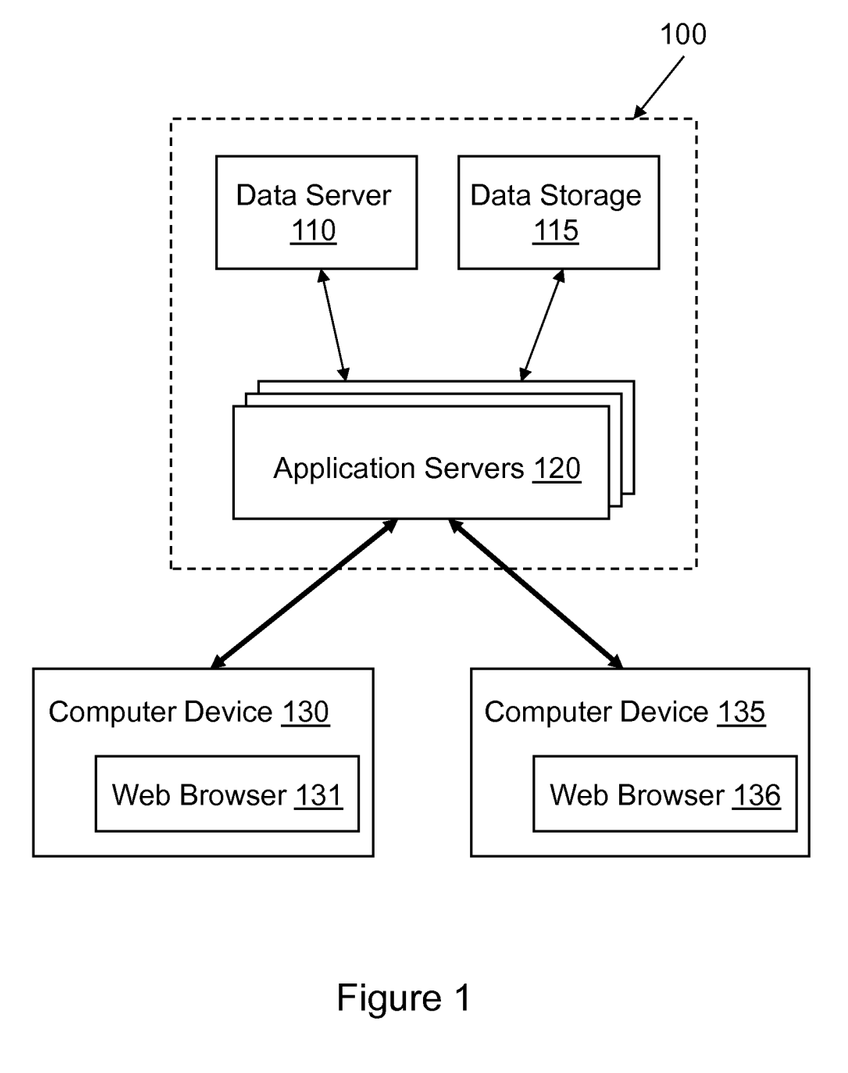
FIG. 1 is a block diagram of a network system allowing real-time webpage co-authoring among multiple users in accordance with the present invention.

Referring to FIG. 1, a network system 100 includes a data server 110 that can receive web page content from an external source, a data storage 115 that can store internally generally web page content and web content generated by users, as described below, and one or more application servers 120 in communication with the data server 110 and the data storage 115 in an internal computer network. The application servers 120 are configured to communicate with computer devices 130, 135 over a computer network. Computer devices 130, 135 can respectively run web browsers 131, 136 using web content supplied by the application servers 120.

The client applications such as web browser software at the computer devices 130, 135 can be connected to application servers 120 via a dedicated network connection (e.g. an HTTP connection) that provides near real-time data communications with minimal network latency. Changes made by each user are stored in the data storage 115 and can be distributed by the application servers 120 to other applications to display updated web pages. In the present application, application server can also be referred as a type of computer processor.

The website can be used for communication, media sharing, and management within group of users. In according to the present invention, the users in the group can use the computer devices 130, 135 to view the content of the web browsers 131, 136, and collaboratively add and modify content in a web page in real time. Depending on the roles of the different users, the users can be given different level of permissions by the management of the network system 100. The permission levels can include, for example, "No Access", "Reader", "Commenter", "Author", "Editor", or "Owner". Commenters, authors, and editors can respectfully contribute or alter web content to different extent.

Figure 2:
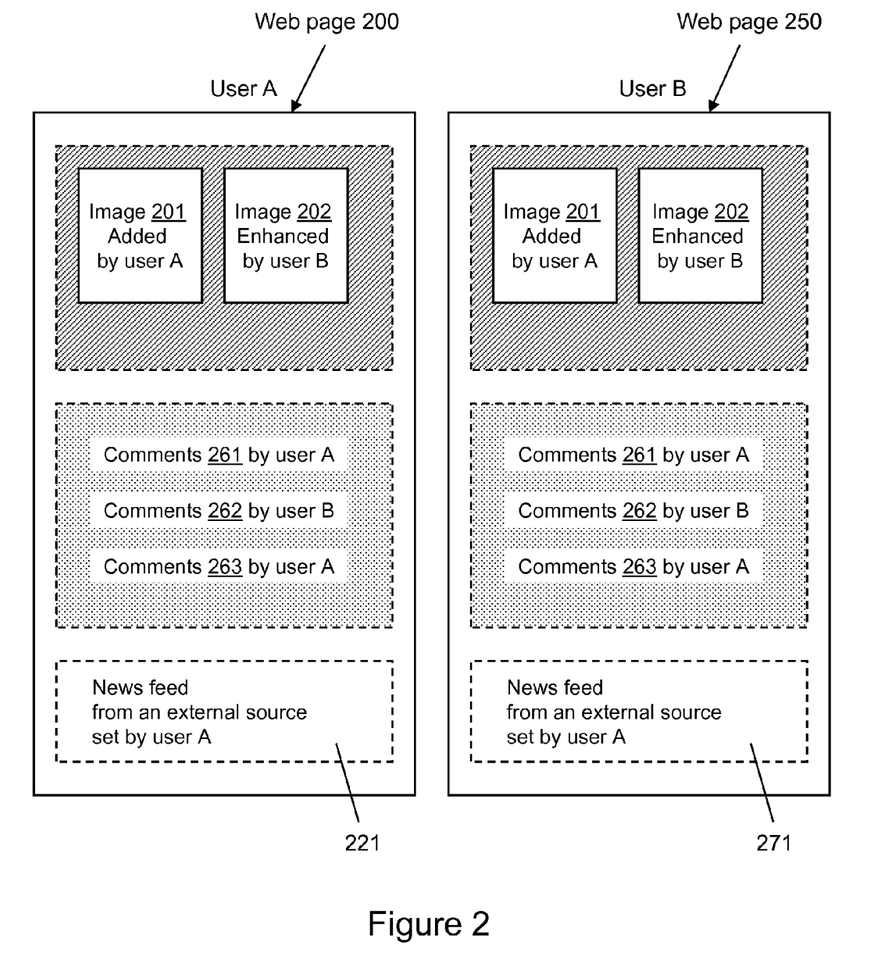
FIG. 2 illustrates layouts of web pages displayed at remote computer devices for enabling real-time webpage co-authoring as shown in FIG. 1.

FIG. 2 shows examples of a web page 200 and a web page 250 that can be respectively displayed by the web browsers 131, 136 (such as Microsoft's Internet Explorer) on the computer devices 130, 135. Users A and B can respectively operate the computer devices 130, 135 to edit the web pages 200, 250. The edited content can appear in real time in the web pages 200, 250 and visible to users A and B. Users A and B can add images to their respective web pages 200, 250 by moving (e.g. dragging and dropping) images from the computer devices 130, 135 into image receiving areas on the web pages 200, 250. The web pages 200 and 250 can include an image 201 posted by user A and an image 202 posted by user B. Users A and B can add text information such as comments to their respective web pages 200, 250 through user interface tools such as keyboard, mouse, and voice input. The web page 200 and 250 can include comments 261, 263 added by user A and comment 262 added by user B. Text, images, and other objects on the web pages 200, 250 can be added, moved, edited, and deleted by multiple users (e.g. user A and user B) at the same time.

Although the image and text information displayed on the web pages 200 and 250 may differ instantaneously as the users A and B was entering the text or moving the image into the web pages 200, 250. Once the text and image information are accepted, the information can be instantly updated in real time such that the users A and B can see the same updated web page content, which would assist their thinking and decision making in co-authoring the web page. As users make changes to the content on the page, these changes are distributed to other users so that the each users' displayed web page reflects the content changes without the user needing to refresh the web page.

The changes simultaneously made by users A and B can be interleaved and posted on the same webpage 200 or 250, which is illustrated by comments 261-263 from user A and user B in FIG. 2. User A can add an image while user B is changing the layout of the web page. Collisions or conflicts can be detected if two or more users attempt to update the same object on the webpage at the same time.

Content can be added simultaneously by multiple users. Rules can be set up to avoid conflicts between the content entered by different users A and B. An exemplified rule can define that early changes take priority over the latter changes. When content edited or moved simultaneously by different users create conflicts, the earlier change may be accepted while the latter changes rejected.

The web page 200, 250 can respectively include sections 221, 271 that can display information received from external sources. The rules for selecting the external source and the type of information can for example set by one or more of the users (e.g. user A). User generated information such as image 201 and comments 261-263 can be integrated with externally sourced information in sections 221, 271 on the web pages 200, 250. Only the internal content, however, can be edited by other users in a group that have editing permission.

Figure 3:
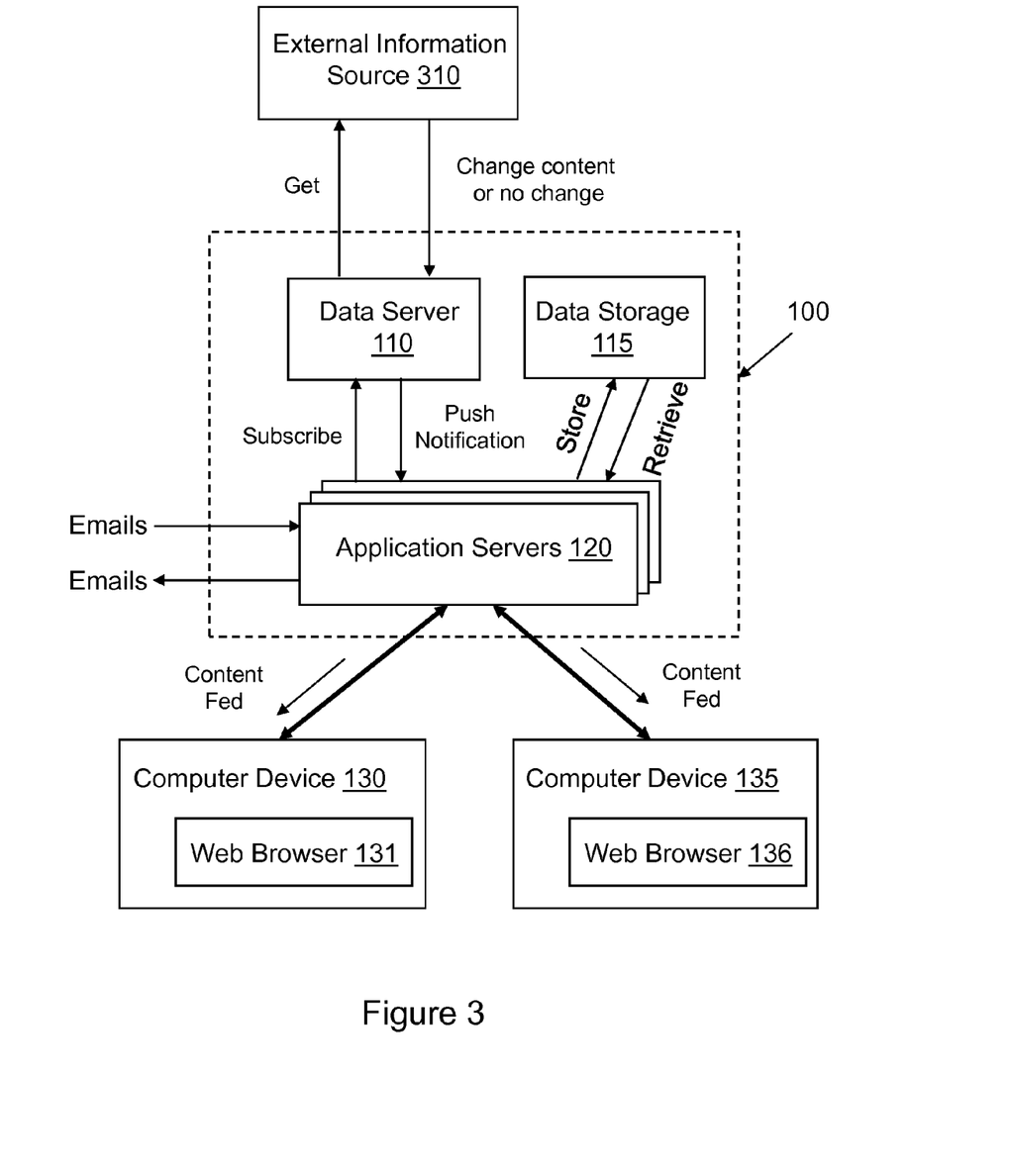
FIG. 3 is a block diagram of the network system in FIG. 1, showing data from external sources to be fed to a webpage and to integrate with internally created content in the webpage.

Referring to FIG. 3, the application servers 120 can store internal web content to the data storage 115. The application servers 120 can also retrieve internal web content to the data storage 115. In the present specification, the internal web content can include user generated web page content as described above (e.g. by user A and user B). The data server 110 can send a "get" command to request updated information from an external information source 310 such as "Yahoo News". The external information source 310 can for example be a Yahoo RSS server. The external information source 310 can respond by providing updated information as set in the rules. Alternatively, the external information source 310 can inform the data server 110 that no changes have occurred. Then no update is needed in the sections 221, 271 in the web pages 200, 250.

The updated external information is sent from the data server 110 to the application servers 120, and subsequently fed to computer devices 130, 135. The information is updated in the sections 221, 271 in the web pages 200, 250.

Examples of external content include live news update, weather information, stock updates, and traffic information. The user can define the type of information to be streamed and the frequency of the updates (e.g. in minutes, hours, or days), which is used by the application server to define the filtering parameters and polling frequency to information request from a content source.

In some embodiments, the end user is not required to specify the update frequency for the external content. The user selects the data feed itself and the frequency is based on a combination of server logic (e.g. default polling frequencies) and information provided by the source feed content (e.g. time to live values). For streaming feeds (e.g. stock market information), the external information source 310 provides the stream. The network system 100 handles distributing the changes as appropriate. When changes to the source data are encountered, they are "pushed" to computer devices 130, 135 where web pages that contain the updated content are displayed.

The externally streamed content can be integrated with content created by the viewer or other users in a group. For example, weather condition at home location of a user's grandparent can be received from an external source and displayed to inform the user live weather conditions at her grandparent's home.

Another example for an updated web content from a user community is the currently voted "Most popular photobook" at a website hosted by a service provider such as Shutterfly, Inc.

Figure 4:
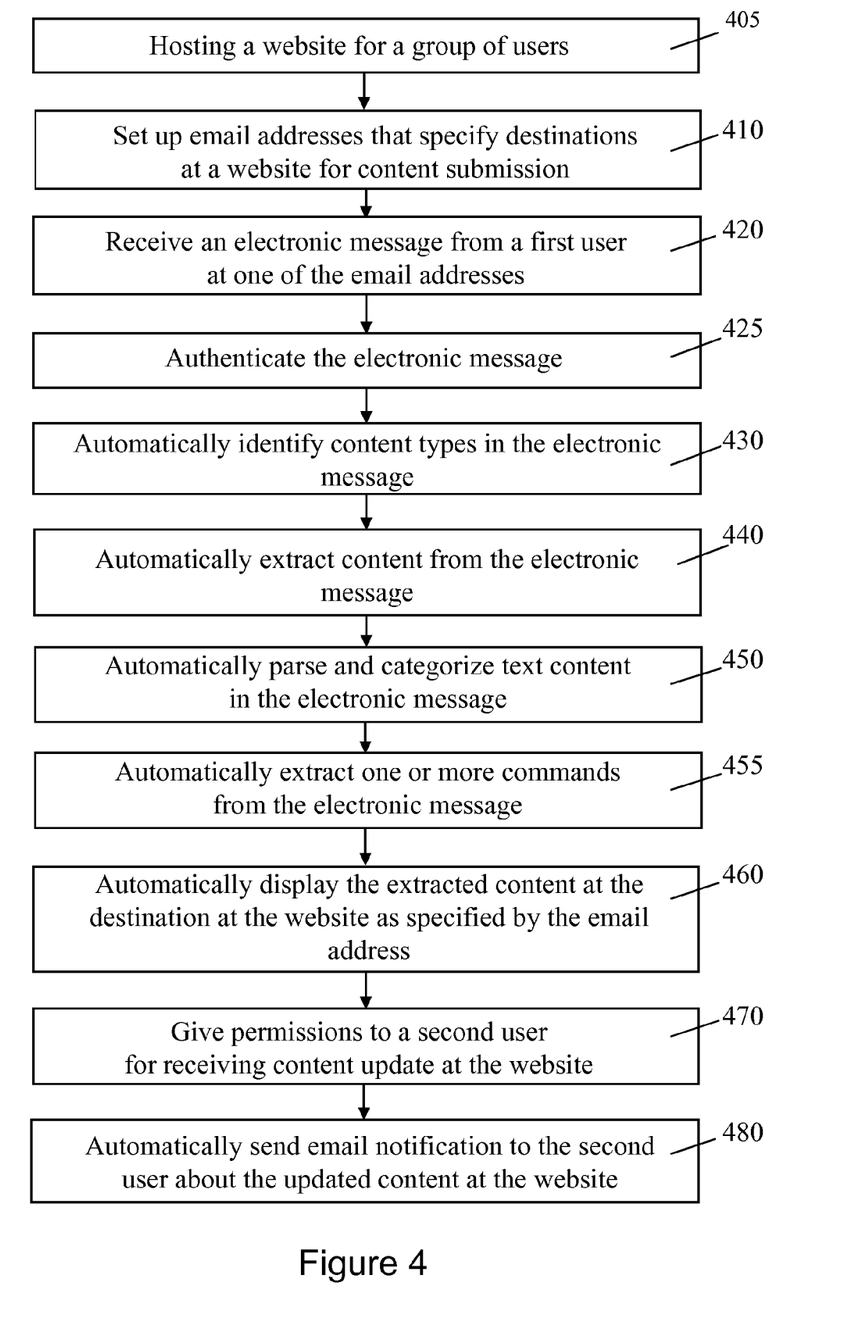
FIG. 4 is a flow chart illustrating a process of posting content for website from users in emails in accordance with the present invention.

In some embodiments, the presently disclosed systems and methods allow users to enter content to a webpage via electronic messages that are already a familiar way of communication. Referring to FIGS. 3 and 4, the network system 100 enables a website to be hosted by service provider for a group of users (step 405). The users can be members of a family, a sports team, or classmates from a school, etc.

Special email addresses are set up for content submissions and stored in the data storage 115 (step 410). Each of the email addresses is associated with a destination at a website. An email address can specify a website, a webpage or a section of a webpage at a website, or an image already displayed on a webpage at the website.

The destination for the content posting is defined by a web address. The email address and the web address can share a common string of characters or one or more common words to help the content contributing users to clearly match the email address with the web address. For example, "mysportsteam" followed by "@nexo.com" can be an email address to receive content to be posted at the website at http: followed by //mysportsteam.nexo.com in which the email address and the web address share the same words. In this scheme, the web address is defined as http: followed by //characterstring1.characterstring2.characterstring3, wherein "characterstring3" is domain class names such as typically "com", "net", "us", and "characterstring2" is a company name such as Nexo or Shutterfly. The email address is defined as "characterstring1" followed by "@characterstring2.characterstring3".

In another example, the email address "mysportsteam.picture" followed by "@nexo.com" can be set up for receiving content for webpage of "http: followed by //mysportsteam.nexo.com/pictures". In this scheme, the web address is defined as http: followed by //characterstring1.characterstring2.characterstring3/characterstring4, wherein "characterstring3" is typically a domain class name such as "com", "net", "us", and "characterstring2" is typically a company or institute name such as Nexo or Shutterfly. The email address is defined as "characterstring1.characterstring4" followed by "@characterstring2.characterstring3".

In general, electronic messages received by these specially set up email addresses are automatically treated by the network system 100 as content submissions to the designated locations at the website.

In some embodiments, the application servers 120 (including an email server) are installed with a content identification engine 123 (FIG. 5) that can automatically distinguish and identify different types of content in electronic message received from users (step 430). The content submitted in emails can include text, images (embedded in text or in attachment), tables, files, voice files, video files, and other types of data. Content submission and posting can also be done based on the data type of the attachment. For example, an image attached to an electronic message can be automatically recognized as image data and get placed on the pictures page.

An electronic message is received from a user in the group of the users by the application servers 120 at the email address "mysportsteam.picture" followed by "@nexo.com" (step 420). The electronic messages for web content submission and publishing exist in different forms, such as emails (hosted by companies such as Google, Yahoo, Hotmail, etc.), text messages (e.g. by Short Message Service), and multimedia messages (e.g. by Multimedia Messaging Service). A user can use different types of computer or communication devices to write and send electronic messages. Aside from different types of computers (desktop, laptop, tablet, etc.), users can use (smart) mobile phones to take pictures, and text the pictures to the designated email addresses, as described in the present disclosure, for publishing on the web. The group of users (family members, friends, et al.) permitted to view the website can get a timely updates about the activities of the person who submitted the content.

In some embodiments, the electronic message and its sender are first authenticated by the network system 100 (FIG. 3) (step 425) before content is extracted from the electronic message. For example, each email address used for web content submission is associated with a user's email address, testing user ID, or a mobile phone number, etc. which identifies the original user (or one of the original users) that is allowed to submit content to the website. If content for web content submission is received at the email address from a source other than the original user, the network system 100 (FIG. 3) can send a confirmation message to the original user (at his or her email address, testing user ID, or a mobile phone number, etc.), and wait for a confirmation that the original user for permission. In order to bypass that handshake, the sender can include a passkey as part of the email address. For example, a pre-established email address embedded with a passkey 1234 can be mysportsteam+1234" followed by "@nexo.com, in which the "+" symbol is a lead marker for passkey. The network system 100 (FIG. 3) can parse the email address to extract and verify the passkey relative to the intended web destination. Once confirmed, the network system 100 (FIG. 3) can accept the content without confirmation.

The content such as images, text, audio or video files, tables in the electronic messages is automatically snatched by a content extraction engine 125 in the application servers 120 (FIG. 5) in accordance to the types of content (step 440). Inline text message is automatically extracted from the electronic message by a computer processor such as the application servers 120 or the data server 110. Images embedded in text or attached in the electronic message are also extracted.

Figure 5:
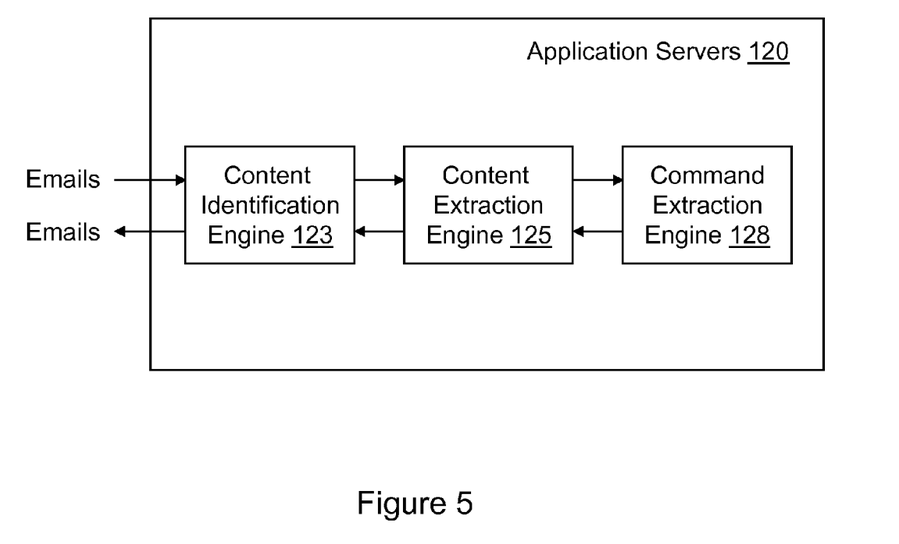
FIG. 5 shows details of content identification, content extraction, and command extract in the network system in accordance with the present invention.

In some embodiments, semantic parsing and interpretation can be performed on the data server 110 or the application servers 120 to interpret an electronic message and automatically categorize it into one or more groups each for an appropriate webpage or a section of a webpage at the website (step 450). In one implementation, semantic parsing and interpretation can be conducted by the content identification engine 123 (FIG. 5). For example, the term "picture", "image", "annotation", "comments", and "picture" can be indicating keywords for categorizing an inline message as comment on to a webpage at http: followed by //mysportteam.nexo.com/pictures.

In some embodiments, one or more commands can be extracted from the electronic message by a command extraction engine 128 in the application servers 120 (FIG. 5) (step 455). A color image submitted in an electronic message to "mysportsteam-pictures=sepia" followed by "@nexo.com" can be automatically identified, extracted, and processed to a sepia image before being posted at "mysportsteam.nexo.com". Similarly, a text submission to email address "mysportsteam-text=bold" followed by "@nexo.com" will be turned to boldface before published at "mysportsteam.nexo.com". In another example, a content submission to email address "mystudyabroad-frequency=weekly" followed by "@nexo.com" will be extracted and recognized by the command extraction engine 128 (FIG. 5) as for a weekly publishing at "mystudyabroad" followed by "@nexo.com". The submitted content will be saved and accumulated and the cumulative content will be published on a weekly base. The commands embedded in the email address can also include subscribe or unsubscribe functions. In some other example, the email address can include are "tagnotifications" and "commentnotifications" to provide the sender an update when the submitted and published content receives a comment or tag from other users.

The text and one or more images extracted from the electronic message can be automatically displayed at the destination at the website by the application servers 120 (step 460). For example, the one or more images extracted from the electronic message are automatically displayed on the webpage at http: followed by //mysportteam.nexo.com/pictures by the application servers 120. Inline text message extracted from the electronic message by the content extraction engine 125 (FIG. 5) and displayed as comments on a webpage at http: followed by //mysportteam.nexo.com/pictures by the application servers 120 (FIG. 3).

In some embodiments, the email address used for web content submission can be built in with demarcations for directing content to certain locations at the website. The email address can also specify an image ID on a web page. For example, "mysportsteam.openinggame.picture8" followed by "@nexo.com" can specify the $8^{th}$ image at the webpage "http: followed by //mysportteam.nexo.com/openinggame" (step 410). Text in an electronic message received at the email address can be automatically extracted by the content extraction engine 125 (FIG. 5) (step 440) and posted as comments on the 8th image on the webpage (step 460) by the application servers 120. In another example, email address "mysportsteam.pictures.1" followed by "@nexo.com" defines a $1^{st}$ module (specified by "1" in the email address), in a web page "pictures" (specified by "pictures" in the email address), at the website "mysportsteam.nexo.com". A module defines a section or a chapter or a story or an event within a webpage that includes multiple sections (chapters, stories, or events).

In some embodiments, an e-mail entry can be used as a way to gather further information from the user that sent the e-mail. In response to an electronic message for web content submission, a second electronic message can be sent out by the application servers 120 to request the content submitter to update her personal profile to be used in a user roster. Polls can also be conducted by the web service email. The second electronic message can also ask for additional input to the webpage specified by the email address. The additional input can include a title for her last text input. The second electronic message containing the requested information is received from the user. Steps 420-460 can be repeated to post the relevant content on a targeted web page at the website. The content can be processed and posted in a fashion as defined by command(s) embedded in the email address. Other information can be stored in the user's account or taken into account in polls, etc.

In some embodiments, still referring to FIGS. 3 and 4, a webpage or a website can be created by one of the users in the group (e.g. family member, a sports team). The user serves as the owner or the manager of the web page or the website, who can give permissions to a set of users to allow them to receive email notifications about the content updates at the web page or on the website (step 470). The recipient user can define the frequency and the types of content that he or she wants to be notified. For example, update at a website or a webpage or a section of a webpage at a specific web address, or update only in a section of a webpage.

The webpage or the website can be updated by submissions via electronic messages, as described above, or using a web browser by users in the group, or updated by the service provider. Once set up, the electronic notifications about updates on a website hosted are automatically sent by the application servers 120 to the set of users according to the rules defined by the set of users (step 480). The electronic notifications can be in the form of emails and other forms such as text messages.

It should be understood that the disclosed systems and methods can exist in many different configurations and are not limited to the specific examples described above. For example, the layout of and the exact nature of the information on a web page can differ from the examples above. The network system can include other components such as a router, a data storage device, a data base and so on. The rules for the external content can differ between different users such that the users can see different external information on their respective computer devices.

What is claimed is:

1. A computer-implemented method for posting content at a web site, comprising:
    hosting a web site, by one or more computer servers, for a group of users comprising a first user and a second user, wherein a destination at the website is located at a web address comprising a string of characters;
    setting up an email address in association with the destination at the website, wherein the email address includes the string of characters that are also in the web address;
    receiving an electronic message at the email address by the one or more computer servers from the first user;
    automatically identifying different types of content in the electronic message by a computer processor;
    automatically extracting the content from the electronic message according to the types of content by the computer processor; and
    automatically posting the content extracted from the electronic message at the destination at the website by the one or more computer servers to allow the group of users including the second user to view the content at the destination at the website.

2. The computer-implemented method of claim 1, wherein the web address and the email address share one or more common words.

3. The computer-implemented method of claim 2, wherein the web address has a format:
    http: followed by //characterstring1.characterstring2.characterstring3, and wherein the email address is set up in a format: "characterstring1" followed by "@characterstring2.Characterstring3", wherein each of "characterstring1", "characterstring2", and "characterstring3" represents a string of characters.

4. The computer-implemented method of claim 2, wherein the web address has a format:
    http: followed by //characterstring1.characterstring2.characterstring3/characterstring4, and wherein the email address is set up in a format:
    "characterstring1.Characterstring4" followed by "@characterstring2.Characterstring3",
    wherein each of "characterstring1", "characterstring2", "characterstring3", and "characterstring4" represents a string of characters.

5. The computer-implemented method of claim 1, wherein the destination at the website comprises a webpage or a section of a webpage.

6. The computer-implemented method of claim 1, wherein the types of content comprises text, an image, a table, a file, a voice file, or a video file.

7. The computer-implemented method of claim 1, wherein the email address is embedded with a command.

8. The computer-implemented method of claim 7, further comprising:
    processing the content extracted from the electronic message in accordance to the command.

9. The computer-implemented method of claim 7, further comprising:
    posting the content extracted from the electronic message in accordance to the command.

10. The computer-implemented method of claim 1, wherein the electronic message is in form of an email, text message, or a multimedia message.

11. The computer-implemented method of claim 1, wherein the electronic message is received from a mobile phone, a desktop computer, a laptop computer, or a tablet computer.

12. The computer-implemented method of claim 1, further comprising:
  extracting a pass key from the electronic message; and
  authenticating the electronic message based verification of the pass key.

13. A computer-implemented method for posting content at a web site, comprising:
  hosting a web site, by one or more computer servers, for a group of users comprising a first user and a second user, wherein a destination at the website is located at a web address comprising a string of characters;
  setting up an email address in association with the destination at the website, wherein the email address includes the string of characters that are also in the web address;
  receiving an electronic message at the email address by the one or more computer servers from the first user, wherein the email address is embedded with a command;
  automatically extracting the content and the command from the electronic message by the computer processor;
  processing the content extracted from the electronic message in accordance to the command; and
  after the step of processing, automatically posting the content extracted from the electronic message at the destination at the website by the one or more computer servers to allow the group of users including the second user to view the content at the destination at the website.

14. The computer-implemented method of claim 13, wherein the web address and the email address share one or more common words.

15. The computer-implemented method of claim 13, wherein the electronic message is in form of an email, text message, or a multimedia message.

16. A computer network system for posting content at a web site, comprising:
  one or more computer servers configured to host a web site for a group of users comprising a first user and a second user;
  a data storage configured to store an email address in association with a destination at the website, wherein the one or more computer servers are configured to receive an electronic message at an email address by the one or more computer servers from the first user, wherein the destination at the website is located at a web address comprising a string of characters, and wherein the email address includes the string of characters that are also in the web address; and
  a computer processor configured to automatically identify different types of content in the electronic message and automatically extract content from the electronic message according to the types of content, wherein the one or more computer servers are configured to automatically post the content extracted from the electronic message at the destination at the website to allow the group of users including the second user to view the content at the destination at the website.

17. The computer network system of claim 16, wherein the web address and the email address share one or more common words.

18. The computer network system of claim 16, wherein the destination at the website defines a webpage, a section of a webpage, or an image previously posted on a webpage at the website.

19. The computer network system of claim 16, wherein the types of content comprises text, an image, a table, a file, a voice file, or a video file.

20. The computer network system of claim 16, wherein the email address is embedded with a command, wherein the content extracted from the electronic message is processed or posted in accordance to the command.

\* \* \* \* \*